US006249783B1

(12) United States Patent
Crone et al.

(10) Patent No.: US 6,249,783 B1
(45) Date of Patent: Jun. 19, 2001

(54) METHOD AND APPARATUS FOR EFFICIENTLY EXECUTING BUILT-IN FUNCTIONS

(75) Inventors: Christopher J. Crone; Patrick M. Malone; Jeffrey R. Ruggles, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,037

(22) Filed: Dec. 17, 1998

(51) Int. Cl.[7] ................................................ G06F 17/30

(52) U.S. Cl. .................. 707/2; 707/1; 707/3; 707/4; 707/5; 707/102; 707/103; 707/104

(58) Field of Search .................................. 707/1, 2, 3, 4, 707/5, 102, 103, 104; 717/8; 714/38; 700/83; 703/203

(56) References Cited

U.S. PATENT DOCUMENTS

| 5,339,430 | 8/1994 | Lundin et al. ................. 709/332 |
|---|---|---|
| 5,339,438 | 8/1994 | Conner et al. ................. 709/332 |
| 5,410,705 | 4/1995 | Jones et al. ................... 709/332 |
| 5,421,016 | 5/1995 | Conner et al. ................. 709/332 |
| 5,428,792 | 6/1995 | Conner et al. ................. 709/332 |
| 5,488,727 | 1/1996 | Agrawal et al. ............... 709/332 |
| 5,493,680 | 2/1996 | Danforth ....................... 709/332 |
| 5,696,974 | 12/1997 | Agrawal et al. ................. 717/9 |
| 5,754,862 | 5/1998 | Jones et al. ..................... 717/5 |
| 5,765,147 * | 6/1998 | Mattos et al. ................... 707/4 |
| 5,822,750 * | 10/1998 | Jou et al. ....................... 707/2 |
| 5,875,334 * | 2/1999 | Chow et al. ..................... 717/5 |
| 5,893,104 * | 4/1999 | Srinivasan et al. ............ 707/102 |

OTHER PUBLICATIONS

Jim Melton (Sybase, Inc.) "An SQL3 Snapshot", Data Engineering, 1996, , pp. 666–672, Mar. 1996.*
IBM Technical Disclosure Bulletin, vol. 40, No. 9, Sep., 1997, "Code Optimization by Hints to the Compiler", pp. 125–128.
M. Clarke, et al. "An Architecture for Dynamically Extensible Operating Systems" Proceedings of the Fourth International Conference on Configurable Distributed Systems, (Cat. No. 98EX159), pp. 145–155, published: Los Alamitos, CA, 1998, viii+233 pp.
D. Lenkov, et al. "Type Identification in C++" Proceedings of the USENIX C++Conference Proceedings, pp. 103–118, published: Berkeley, CA, 1991, 243 pp.

* cited by examiner

Primary Examiner—Thomas Black
Assistant Examiner—Diane D. Mizrahi
(74) Attorney, Agent, or Firm—Sughrue, Mion, Zinn, Macpeak & Seas, PLLC

(57) ABSTRACT

A method, apparatus and article of manufacture for computer implemented method of efficiently executing built-in functions is defined. Function modules are defined to process a single data type class and to process as many functions as possible before returning to the caller. Functions related to a query are each assigned a key, a type of code, to indicate the data type class to which the function belongs. The functions are then ordered so that a particular module scope can be held as long as possible. Further, data fields, another type of code containing optimization information, can be added to the functions to further enable the holding of module scope. Finally, the functions are executed at runtime. During execution, the database system looks ahead at upcoming functions in an attempt anticipate the next course of action by examining the keys and data fields. Various additional optimization techniques can then be used to enhance runtime performance.

30 Claims, 6 Drawing Sheets

METHOD AND APPARATUS FOR EFFICIENTLY EXECUTING BUILT-IN FUNCTIONS

BACKGROUND OF THE INVENTION

1. Field of the Invention

This invention relates in general to computer-implemented database systems, and, in particular, to architecting the flow of built-in functions to enhance performance during runtime in a database system.

2. Description of the Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD), such as magnetic or optical disk drives for semi-permanent storage.

Processing information, e.g. user applied queries, in database systems through the execution of various functions used to be much simpler. In the past, only a few simple functions existed. Thus, all of the functions could be contained within a single module, a single logical location, for execution.

Over time, a larger number of database functions have been implemented and the functions have become more complex. In addition, databases have been taking on a greater burden by implicitly casting and converting between different data type formats. As a result, the number of functions and the cumulative size and complexity of these new functions have overflowed the simple module design. Thus, it is desirable to split the functions amongst multiple modules. This is so because, if at run time a function must be selected from a single large list of possible functions, i.e. in a single module, it becomes unwieldy to traverse the entire list each time a function must be executed. Thus, having a single module is not practical. However, a multiple module structure also has drawbacks, as module calls are resource expensive.

Each time a module is called, a great number of instructions must be executed to set up a new stack area, new data area, etc. Due to the large number of functions, there are a large number of modules, even if functions are broken up into units based on related types or classes. However, in order to be efficient at run time, there is a need to limit the number of module calls. The key is to properly define the units of work, the modules, which include not only the functions themselves, but also related operations, e.g. checking for nullity of data, encoding/decoding the function, etc.

While past systems have defined modules to handle a specific class type, there has been no optimization directed to holding module scope as long as possible. By holding module scope as long as possible, two goals are accomplished. First, there is a reduction in the number of expensive module calls. Second, the scope, or number, of functions examined within each module is reduced, which reduces processing effort.

Therefore, there is a need in the art for techniques that more efficiently execute built-in functions by holding module scope as long as possible.

SUMMARY OF THE INVENTION

To overcome the limitations in the prior art described above, and to overcome other limitations that will become apparent upon reading and understanding the present specification, the present invention discloses a method, apparatus and article of manufacture for a computer-implemented method of efficiently executing built-in functions.

In accordance with the present invention, function modules are defined to process a single data type class. This allows the module to be optimized to the particular data type class and, thus, limits the number of functions to be recognized by a single function module. The modules are further defined to process as many functions as possible before returning to the caller. Users are likely to execute several functions on the same data type in a row. Therefore, the odds of being able to stay in the module and process the next function are good. Then, when a query to be applied to the database system is issued, functions related to the query are each assigned a key, a type of code, to indicate the data type class to which the function belongs. The functions to be executed are then ordered so that a particular module scope can be held as long as possible. Further, data fields, another type of code containing optimization information, can be added to the functions to further enable the holding of module scope. Finally, the functions are executed at runtime. During execution, the database system looks ahead at upcoming functions in an attempt to anticipate the next course of action by examining the keys and data fields which have been assigned to the functions. Various additional optimization techniques can then be used to enhance runtime performance.

An object of the present invention is to architect the flow of built-in functions to enhance performance during runtime. Recognizing functions and making module calls are expensive operations in terms of runtime performance. The provision of an efficient architecture can reduce the scale of these operations.

Another object of the present invention is to reduce the number of module calls made by holding the module scope as long as possible. This is accomplished through various optimizations of the flow of the functions.

Another object of the present invention is to reduce the cost of recognizing functions by eliminating functions not referenced in the current scope. This is accomplished by the definition of the modules to handle a particular data type class. The number of functions to be recognized by a particular module is limited, as the number of functions that operate on a particular data type is always less than the total number of functions.

BRIEF DESCRIPTION OF THE DRAWINGS

The above objects and advantages of the present invention will become more apparent by describing in detail preferred embodiments thereof with reference to the attached drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Figure 1:
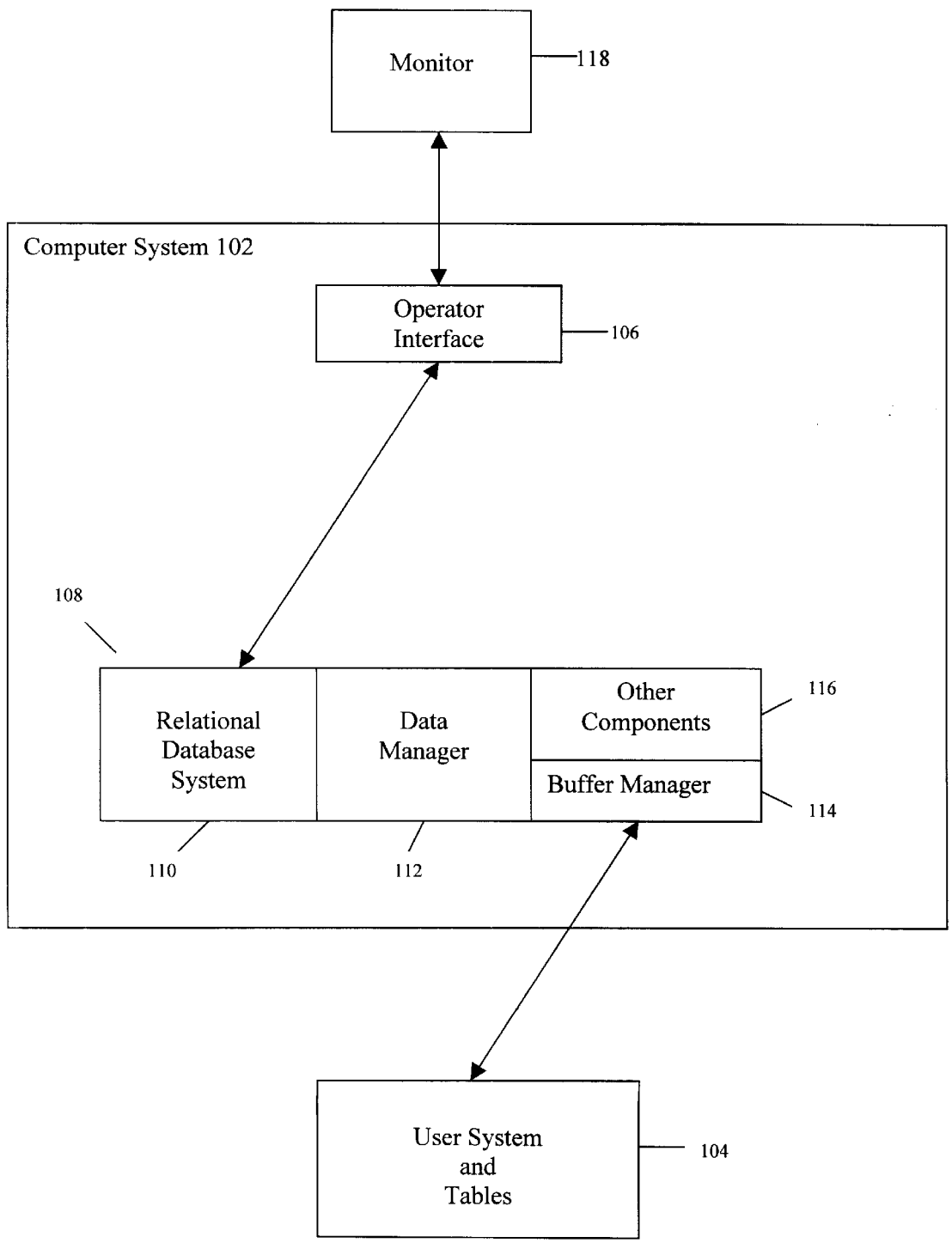
FIG. 1 illustrates an exemplary computer hardware environment that may be used in accordance with the present invention.

FIG. 1 illustrates an exemplary computer hardware environment that may be used in accordance with the present invention. In the exemplary environment, a computer system 102 is comprised of one or more processors connected to one or more data storage devices 104 that store one or more relational databases. A data storage device 104 may be a fixed or hard disk drive, a floppy disk drive, a CDROM drive, a tape drive, or other device.

Operators of the computer system 102 use a standard operator interface 106, such as IMS/DB/DC®, CICS®, TSO®, OS/390®, ODBC® or other appropriate interface, to transmit electrical signals to and from the computer system 102 that represent commands for performing various search and retrieval functions, termed queries, against the databases. In the present invention, these queries employ Structured Query Language (SQL) and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM Corporation (IBM) for the MVS® or OS/390® operating systems. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software and the instructions derived therefrom are all tangibly embodied in a computer-readable medium, e.g. one or more of the data storage devices 104. Moreover, the RDBMS software and the instructions derived therefrom, are all comprised of instructions which, when read and executed by the computer system 102, causes the computer system 102 to perform the steps necessary to implement and/or use the present invention. Under control of an operating system, the RDBMS software and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize that many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
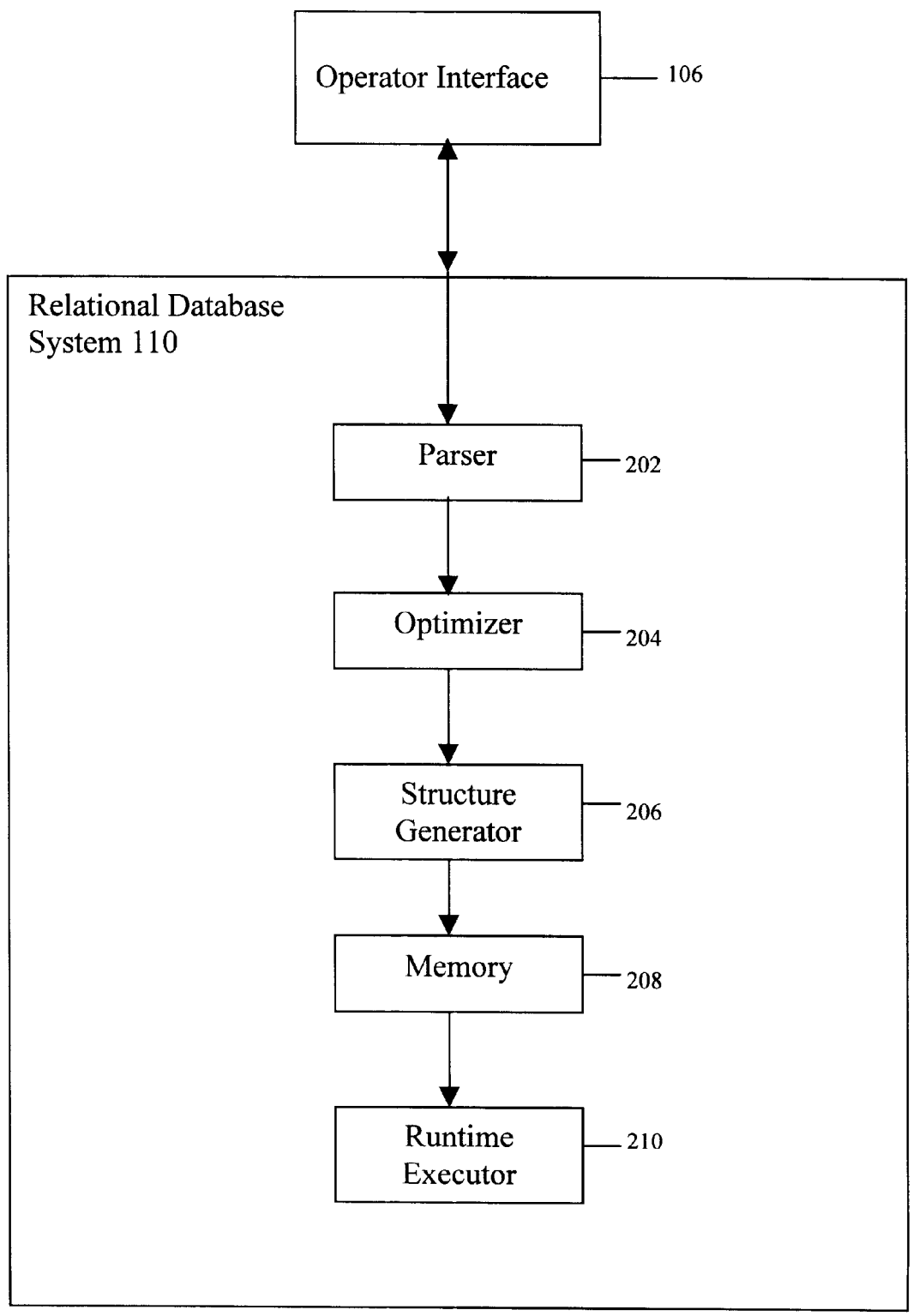
FIG. 2 illustrates further details of a portion of the exemplary computer hardware environment that may be used in accordance with the present invention.

The Database Services module's 108 derivation or synthesis of instructions from the SQL statements, and subsequent execution of the instructions by the computer system 102 will now be discussed in more detail in conjunction with FIG. 2. FIG. 2 illustrates the logical flow of the SQL statements and instructions through several components within the Relational Database System 110.

Initially, the SQL statements are parsed by the parser 202 into a corresponding parse tree. The parse tree is a semantic tree structure, which contains the functions related to the statements and also defines the relationships between the functions. Then, the optimizer 204 assigns keys, a type of code, to each of the functions, indicating a particular data type class to which the functions belong. The optimizer 204 may also rearrange the order in which the functions are to be processed in order to increase locality. This can only be done for functions which are not dependent upon the order in which they are executed. The structure generator 206 then traverses the parse tree to produce a tree structure suitable for runtime and creates an application plan. The structure generator 206 may also insert data fields, another type of code, in the functions which are used at runtime to implement optimization techniques. The output of the structure generator 206 is essentially a list of functions to be executed at runtime, which may have various codes inserted and which may have been rearranged. The application plan is then stored in a memory 208. The foregoing steps are carried out in what is called a compile phase, also known as a bind or optimization phase. Subsequently, a runtime executor 210 executes the functions as laid out in the application plan during the runtime phase and further implements runtime optimizations as indicated by the codes and rearrangement. The details of the various runtime optimization techniques will be presented below.

Figure 3:
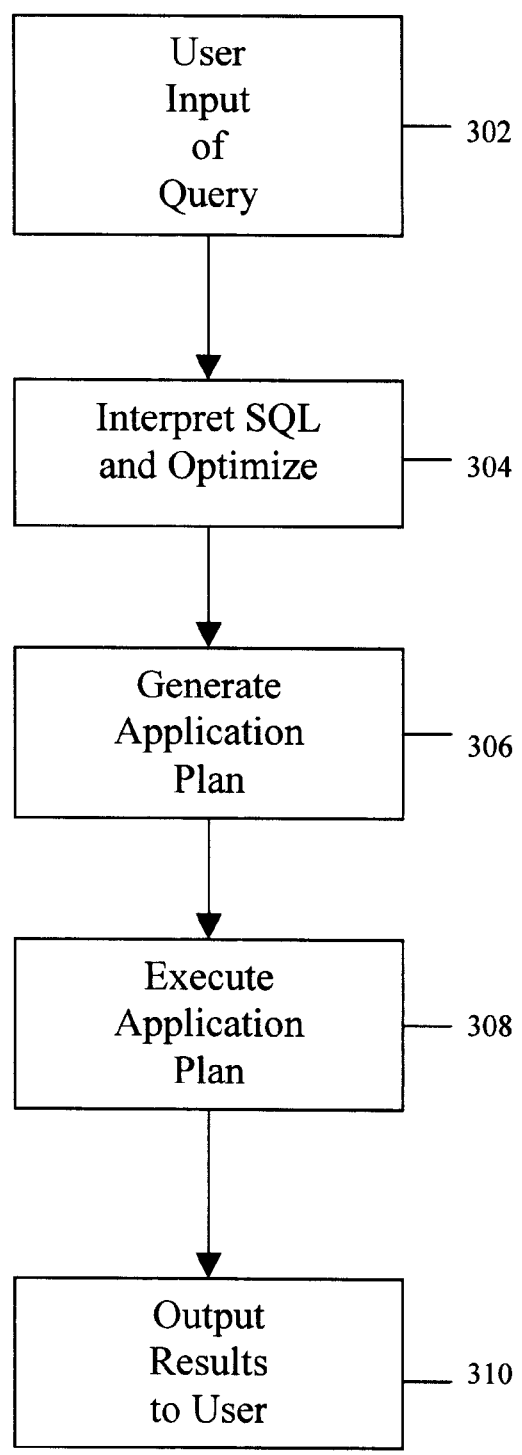
FIG. 3 illustrates a flow diagram showing the steps necessary for the interpretation and execution of Structure Query Language (SQL) statements in an interactive environment according to the present invention.

FIG. 3 is a flowchart which conceptually illustrates the steps carried out by the components depicted in FIG. 2 to interpret and execute the SQL statements in an interactive environment according to the present invention. Block 302 represents the input of SQL statements into the computer system 102 from the user. As noted above, the SQL statements may also be retrieved from the data storage devices 104. Block 304 represents the step of compiling or interpreting the SQL statements. The optimization of the SQL statements then takes place within block 304. Block 306 represents the step of generating the application plan, a compiled set of run-time structures, from the compiled SQL statements. Generally, the SQL statements received as input from the user specify only the data that the user wants but not how to get to the data. The steps through the generation of the application plan consider both the available access paths (indexes, sequential reads, etc.) and system held statistics on the data to be accessed (the size of the table, the number of distinct values in a particular column, etc.), to choose what it considers to be the most efficient access path for the query. Block 308 represents the execution of the application plan and any further runtime optimizations which take place, and block 310 represents the output of the results of the application plan to the user.

The present invention will now be described in further detail. The present invention takes place in a context where, initially, function modules are defined so that each function module processes a single class of functions, where a class is a group of data types. Since each function module is defined to process a single class of functions, the total number of functions which must be recognized by each module is less than the total number of functions. The classes may be defined based on the following criteria, for example: members of a class are easily converted between other members, the actual data type structure is similar and members require similar methods to operate on them. For instance, integer and small integer are combined into one module, whereas single byte character strings are combined into a different module. Each module additionally contains the following: methods to convert other primitive data types to the module's primitive data types, functions that operate on the module's data type, common utility code for the module's data type class, and operations to check for nullability. A primitive data type is the smallest piece of data supported by the database. The motivation for this organization is to optimize the operations on a specific data type. Other than conversions, most functions return the same data type group that it takes in as input. If the user executes another function it is likely to be handled locally.

In DB2® for OS/390®, for example, the following classes may be used: non-specific types, integers, decimals, double precision floating point numbers (S/390 format), single byte character strings, double byte character strings, mixed ASCII character strings, mixed EBCDIC character strings, time related strings (e.g. time, date and time stamp), large objects, rowids, and functions that are only interested in the nullability.

As described above, when a query is applied to the database system, the SQL statements making up the query are parsed into a parse tree containing the functions relating to the statements as well as any relationships between the statements. Then an optimization function is applied, where each of the functions is given an output encoding to represent the class to which it belongs, i.e. a key, a type of code, is assigned to each function to enhance optimization during runtime. These encodings are used to associate each of the functions with the correct modules. For instance, addition is processed in the floating point module, the integer module and the decimal module. The optimization function may also modify the order in which the functions are executed to increase locality (i.e. the functions are reordered so that sequential functions may be executed within the same module), so long as any dependencies between the functions are honored. Subsequent to optimization, an application plan is produced, which is essentially the runtime plan for execution of the functions. This is performed by the structure generator. The structure generator may also insert additional data fields, further codes, into the functions to specify how optimization techniques will be automatically implemented at runtime. The application plan is then stored in memory until execution by a runtime executor. The use of the various types of codes as well as the reordering of the functions enable the present function to accomplish the goal of holding module scope as long as possible.

Five specific techniques may be used during the steps just described to optimize the execution of the functions.

1) Built-in function look ahead at runtime: In each module, after processing a function, but before returning to the calling entity, the next function is examined to determine if it can be processed in the same module. This determination can be made by examining the key assigned to the next function. If the next function can be processed in the next module, the function is executed. This process is continued until the next function cannot be processes in the present module, in which case, a return is executed.

2) Call forward (Enable look ahead): Code is added to each module such that each module knows which module to call for each function. During runtime, after execution of a function, a determination is made as to whether the next operation is a function. If the next operation is a function, its key is examined to determine if it can be processed in the present module. If the function can be processed in the present module, the first technique is used. If the function cannot be processed in the present module, a second module is called from the present module to process the next function without making a return, i.e. a call forward is implemented. The call forward designation may be indicated in the data field code inserted by the structure generator. The second module call, made from the present module prior to returning to the calling entity, results in a smaller lookup scope than would have resulted if the system had returned to the calling entity prior to making the second module call.

3) Call forward with fall back data structure (Keep track of called modules):. Rather than blindly calling forward to execute the next function, it is first determined whether the next module to be called is one that has been called in the past. This is done by examining the call stack. If the module to be called is in the call stack, then a fall back to that module is performed. The fall back saves a module call by allowing modules to process multiple functions even if intermediate calls have been made. The fall back designation may be indicated in the data field code inserted by the structure generator.

4) Best palindrome fitting (Enable call forward and fall back): During optimization, functions are sorted for better performance. Due to dependencies, not all like functions (e.g. functions to be executed by the same module) will sort to be successive functions. Therefore, a best fit palindrome algorithm can be performed on the list of functions to mark each function, during structure generation, with an indication of whether a call forward or fall back can be performed. This marking is then examined and implemented at runtime.

5) Compile time sorting: During the compile time optimization phase items in the function list can be sorted to artificially increase the locality of data. This is only possible so long as items are order independent. Dependence is determined from the semantic tree describing the operation.

Each of these five techniques will now be discussed in further detail.

Figure 4:
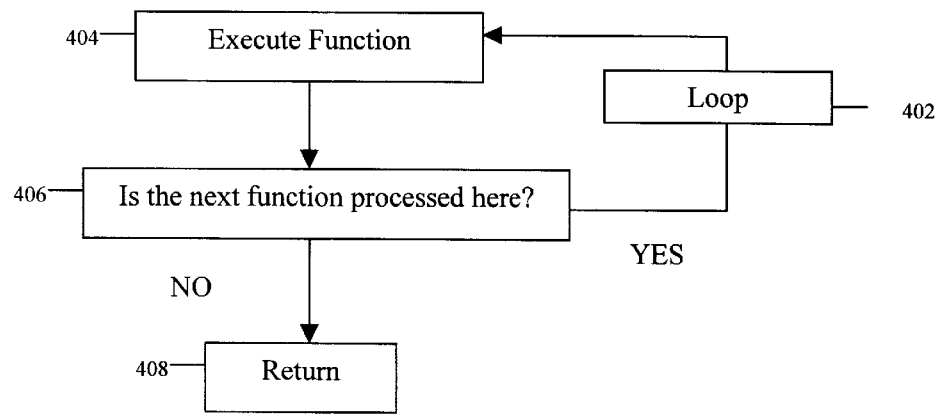
FIG. 4 illustrates a flow diagram showing an example of a first optimization technique.

The first technique is built-in function look-ahead. The steps carried out to accomplish this technique are shown in FIG. 4. Execution begins by looking at the output encoding or key of the first function to be executed, the key having been assigned during optimization. Then, the appropriate module is called and the function is executed in Step 404. Next, in Step 406, the output encoding or key, also assigned during optimization, of the next function to be executed is examined to determine if the function can be executed in the presently called module. If the function cannot be processed in the presently called module, a return is executed in Step 408. If the function can be processed in the presently called module, the system loops to Step 402 and then executes the function in Step 404. This process is continued until a return is executed.

Figure 5:
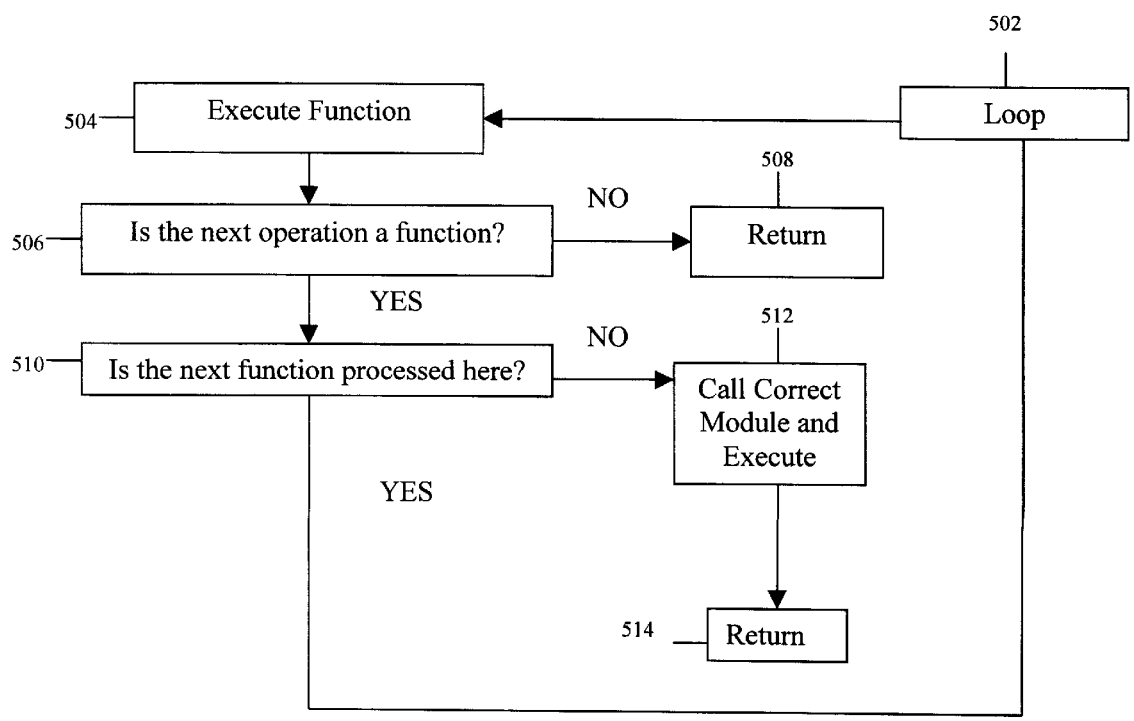
FIG. 5 illustrates a flow diagram showing an example of a second optimization technique.

The second technique makes each module aware of all the others. The steps carried out to accomplish this technique are shown in FIG. 5. Similarly to the first technique, execution begins by looking at the output encoding or key of the first function to be executed. The appropriate module is called and the function is executed in Step 504. Then, in step 506, a determination is made as to whether the next operation is a function. If it is not, a return is executed in Step 508. If the next operation is a function, its output encoding or key is examined to determine if the function can be executed in the presently called module. If the function can be executed in the presently called module, the system loops to Step 502 and continues on as described above. However, if the subsequent function is not to be executed in the presently called module, then a call forward is performed to retrieve the appropriate module and the function is executed in Step 512. Steps similar to Steps 504–510 are then recursively performed for subsequent functions until no more functions can be executed. A return is then executed in Step 514. It is to be noted that during the recursive processing, several call forwards may be performed prior to executing the return in Step 516. A designation indicating that the call forward is to be performed may be placed in the data field code by the structure generator. Then, during runtime, the determination of whether the call forward is to be executed can be made by examining the data field. This is beneficial because the context is more specific when the second module is called from the first module, rather than from the original calling entity, and therefore, the lookup is faster. A counter can be added to limit to the nesting and fall back when system limitations require.

Figure 6:
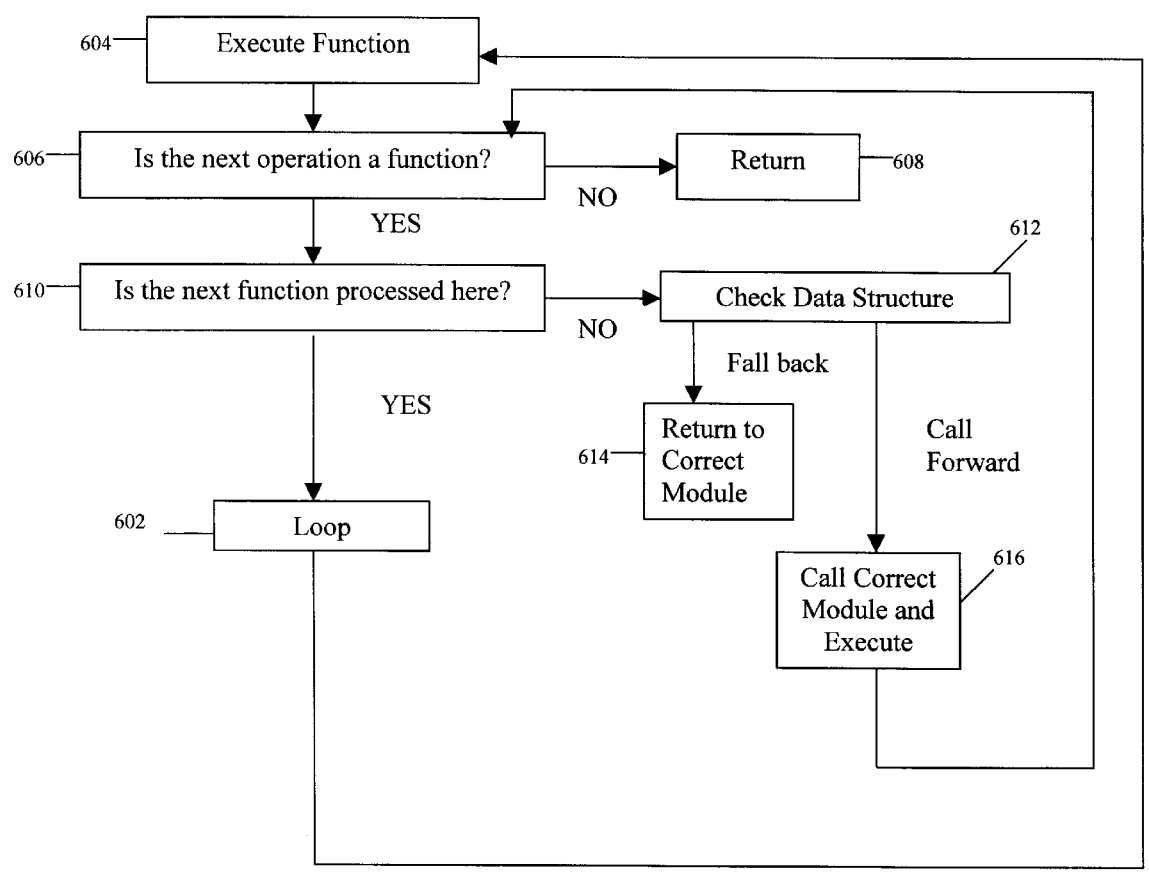
FIG. 6 illustrates a flow diagram showing an example of a third optimization technique.

The third technique allows for both call forward and fall back. The steps carried out to implement this technique are shown in FIG. 6. Steps 602–610 correspond to Steps 502–510 discussed above, and need not be reiterated here. In this technique, a bit mapped data structure, a call stack, is used to keep track of modules which have been called. In Step 610, if a determination is made that the next function is not to be executed in the presently called module, the data structure is consulted in Step 612 to determine if the module which will execute the next function is in the call stack. If the module is in the call stack, a fall back is executed to that module in Step 614. If the module to execute the next function is not in the call stack, a call forward is performed to call the module and the function is executed in Step 616.. A designation indicating that the call forward or fall back is to be performed may be placed in the data field code by the structure generator. Then, during runtime, the determination of whether the call forward or fall back is to be executed can be made by examining the data field. Returning to Step 616, as discussed above in connection with the second technique, steps similar to steps 604–610 can be recursively performed. During this recursive processing functions may be executed with in a single module. Alternatively, call forwards or fall backs may be performed during the recursive processing. At some point, a return is made to the originally called module and processing continues at Step 606. This technique effectively limits the total nesting to be the total number of data type classes. The worst case performance characteristics are the same as the base case. However, this technique has the added advantage of reusing modules in the stack as each module returns to its caller. Saving module calls results in better runtime performance.

Figure 7A:
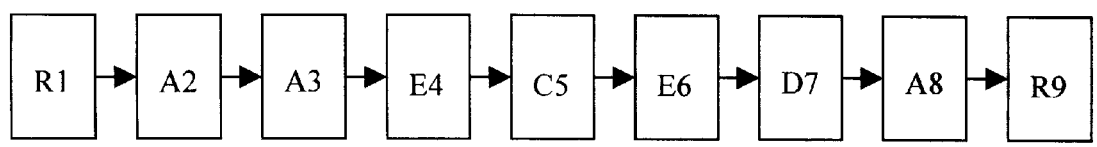
FIGS. 7(a)–7(c) illustrate an example to which a fourth optimization technique is applied.
Figure 7B:
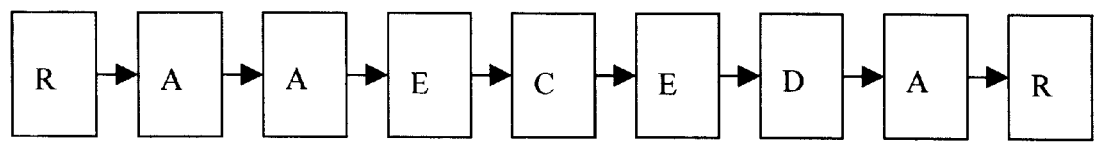
Figure 7C:
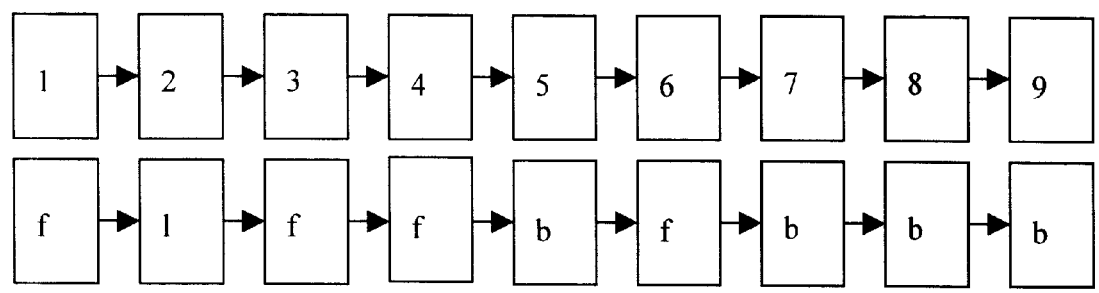

The fourth technique performs a recursive best fit palindromic optimization and is shown in FIGS. 7(a)–7(c). In this technique, a list of functions to be executed is reordered at optimization and is then examined. Then, an indication is made as to whether execution of the following function requires a call forward or fall back. This indication may be placed in the data field of the function by the structure generator. Due to the nature of the call stack, advantage of an optimization based on palindromes can be taken. A palindrome is a word that reads the same forward and backward, like RADAR. For each palindrome the number of module calls needed is equal to the length of the palindrome divided by two plus the remainder (roughly half.)

Functions with the same output encoding or key that are adjacent to each other count as a single unit in the total length of the palindrome since the basic looping property will force the functions to be processed in the same module. Consider three functions with output encoding in the following set: (R,A,D). If the functions are ordered as R−>A−>D−>A−>R, the first two functions can be marked as call forward and the last three as fall back. This brings the number of module calls needed down to three. The last two functions are picked up as the system returns to the previous caller. The best fit palindrome may actually have embedded palindromes inside of it. Consider the sequence of functions shown in FIG. 7(a). The upper case letter represents current module and the number represents the functions currently being processed. The algorithm would produce the module flow shown in FIG. 7(b) and have the corresponding data structure shown in FIG. 7(c). Each function is marked where (f) is for call forward, (b) is for fall back and (l) is for loop.

The fifth technique involves dependency list sorting. The dependency of functions on other functions is preserved in the parse tree. Functions that do not depend on each other can be ordered arbitrarily. Thus, as long as each item in the list is independent the items can be ordered during optimization in whatever way is most advantageous at compile time. In this case, functions with like encodings can be ordered together. Consider the following example of a select statement, where the letters represent the result type encoding of data returned:

SELECT A(B(C()),C(D()),E(B()) FROM SYSIBM.SYS-
DUMMY1;

The straightforward function list would look like this:

(C1->B1->A1)->(D2->C2)->(B3->E3)

This would involve seven module calls. If however, the list is sorted based on result encoding type and honoring dependencies, the following list results:

D2->C1->C2->B1->B3->A1->E3.

The sorting results in a reduction in the number of module calls necessary from seven to five.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented method of efficiently executing built-in functions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of efficiently executing a query in a database system, the query having been parsed to obtain a related set of functions, the method comprising the steps of:

defining a set of function modules, wherein each function module is defined to process a single class of data types, thereby limiting a number of functions to be recognized by each function module; and assigning each function in the set of functions a key, the key representing the class of data types to which each function belongs.

2. The method according to claim 1, further comprising the step of:

rearranging an order in which each function in the set of functions is executed to increase locality, thereby optimizing runtime performance.

3. The method according to claim 1, further comprising the step of:

executing each function in a presently called module, while examining the key of a subsequent function from the set of functions to determine a next course of action.

4. The method according to claim 1, wherein in said defining step, each of the function modules is further defined to process simple operations associated with the class of functions, thereby merging the simple operations with the associated class of functions into a single unit.

5. The method according to claim 3, wherein in the executing step, when the key indicates that the subsequent function is to be executed in the presently called module, the subsequent function is executed prior to issuing a return, thereby further optimizing runtime performance.

6. The method according to claim 5, further comprising the step of:

prior to the executing step, assigning a code to each function, the code indicating whether execution of the subsequent function requires a call forward to a subsequent module or a fall back to a previous module.

7. The method according to claim 6, wherein the executing step further comprises examining the code and, wherein when the key indicates that the subsequent function is not to be executed in the presently called module, and the code indicates that execution of the subsequent function requires a call forward to the subsequent module, the subsequent module is called and the subsequent function is executed prior to issuing a return.

8. The method according to claim 7, wherein in the executing step, when the key indicates that the subsequent function is not to be executed in the presently called module, and the code indicates that execution of the subsequent function requires a fall back to the previous module, the previous module is returned to and the subsequent function is executed prior to issuing a return.

9. The method according to claim 3, further comprising the step of:

prior to the executing step, sorting each function and assigning each function a code indicating whether execution of each function requires a call forward to a subsequent module, fall back to a previous module or loop to the presently called module;

wherein the executing step further comprises examining the code of the subsequent function and executing one of the call forward, fall back and loop based on the code, to execute the subsequent function.

10. The method according to claim 2, wherein in the rearranging step, the locality is increased by ordering together each function having the same key, while honoring dependencies between the functions.

11. An apparatus for efficiently executing a query in a database system, the query having been parsed to obtain a related set of functions, the apparatus comprising:

a computer having a data storage device connected thereto, wherein the data storage device stored the database system; and one or more computer programs performed by the computer for:

defining a set of function modules, wherein each function module is defined to process a single class of data types, thereby limiting a number of functions to be recognized by each function module; and assigning each function in the set of functions a key, the key representing the class of data types to which each function belongs.

12. The apparatus according to claim 11, wherein the one or more computer programs performed by the computer further rearranges an order in which each function in the set of functions is executed to increase locality, thereby optimizing runtime performance.

13. The apparatus according to claim 11, wherein the one or more computer programs performed by the computer further executes each function in a presently called module, while examining the key of a subsequent function from the set of functions to determine a next course of action.

14. The apparatus according to claim 11, wherein the one or more computer programs performed by the computer further defines each function to process simple operations associated with the class of functions, thereby merging the simple operations with the associated class of functions into a single unit.

15. The apparatus according to claim 11, wherein the one or more computer programs performed by the computer, further executes the subsequent function prior to issuing a return when the key indicates that the subsequent function is to be executed in the presently called module, thereby further optimizing runtime performance.

16. The apparatus according to claim 15, wherein the one or more computer programs performed by the computer further assigns a code to each function prior to executing, the code indicating whether execution of the subsequent function requires a call forward to a subsequent module or a fall back to a previous module.

17. The apparatus according to claim 16, wherein the one or more computer programs performed by the computer further examines the code during executing and, wherein when the key indicates that the subsequent function is not to be executed in the presently called module, and the code indicates that execution of the subsequent function requires a call forward to the subsequent module, the subsequent module is called and the subsequent function is executed prior to issuing a return.

18. The apparatus according to claim 17, wherein the one or more computer programs performed by the computer, during executing, further returns to the previous module and executes the subsequent function prior to issuing a return, when the key indicates that the subsequent function is not to be executed in the presently called module, and the code indicates that execution of the subsequent function requires a fall back to the previous module.

19. The apparatus according to claim 13, wherein the one or more computer programs performed by the computer further sorts each function and assigns each function a code, prior to executing, indicating whether execution of each function requires a call forward to a subsequent module, fall back to a previous module or loop to the presently called module;

further wherein during executing, the one or more computer programs performed by the computer examines the code of the subsequent function and executes one of the call forward, fall back and loop based on the code, to execute the subsequent function.

20. The apparatus according to claim 12, wherein the one or more computer programs performed by the computer further increases the locality, during rearranging, by ordering together each function having the same key, while honoring dependencies between the functions.

21. An article of manufacture comprising a program storage device readable by a computer and tangibly embodying one or more programs of instructions executable by the computer to perform method steps for efficiently executing a query in a database system, the query having been parsed to obtain a related set of functions, the computer having a data storage device coupled thereto for storing the database system, the method comprising the steps of:

defining a set of function modules, wherein each function module is defined to process a single class of data types, thereby limiting a number of functions to be recognized by each function module; and assigning each function in the set of functions a key, the key representing the class of data types to which each function belongs.

22. The article of manufacture according to claim 21, further comprising the step of:

rearranging an order in which each function in the set of functions is executed to increase locality, thereby optimizing runtime performance.

23. The article of manufacture according to claim 21, further comprising the step of:

executing each function in a presently called module, while examining the key of a subsequent function from the set of functions to determine a next course of action.

24. The article of manufacture according to claim 21, wherein in said defining step, each of the function modules is further defined to process simple operations associated with the class of functions, thereby merging the simple operations with the associated class of functions into a single unit.

25. The article of manufacture according to claim 23, wherein in the executing step, when the key indicates that the subsequent function is to be executed in the presently called module, the subsequent function is executed prior to issuing a return, thereby further optimizing runtime performance.

26. The article of manufacture according to claim 25, further comprising the step of:

prior to the executing step, assigning a code to each function, the code indicating whether execution of the subsequent function requires a call forward to a subsequent module or a fall back to a previous module.

27. The article of manufacture according to claim 26, wherein the executing step further comprises examining the code and, wherein when the key indicates that the subsequent function is not to be executed in the presently called module, and the code indicates that execution of the subsequent function requires a call forward to the subsequent module, the subsequent module is called and the subsequent function is executed prior to issuing a return.

28. The article of manufacture according to claim 27, wherein in the executing step, when the key indicates that the subsequent function is not to be executed in the presently called module, and the code indicates that execution of the subsequent function requires a fall back to the previous module, the previous module is returned to and the subsequent function is executed prior to issuing a return.

29. The article of manufacture according to claim 23, further comprising the step of:

prior to the executing step, sorting each function and assigning each function a code indicating whether execution of each function requires a call forward to a subsequent module, fall back to a previous module or loop to the presently called module;

wherein the executing step further comprises examining the code of the subsequent function and executing one of the call forward, fall back and loop based on the code, to execute the subsequent function.

30. The article of manufacture according to claim 22, wherein in the rearranging step, the locality is increased by ordering together each function having the same key, while honoring dependencies between the functions.

* * * * *